US012283188B1

(12) United States Patent
Liu et al.

(10) Patent No.: US 12,283,188 B1
(45) Date of Patent: Apr. 22, 2025

(54) METHOD FOR SCHEDULING CARS AT NARROW CURVE BASED ON PARKING SPACE FOR TEMPORARY AVOIDANCE

(71) Applicants: Jinan University, Guangzhou (CN); Shenzhen Lanyou Technology Co., Ltd., Shenzhen (CN)

(72) Inventors: Zhiquan Liu, Guangzhou (CN); Yong Ma, Guangzhou (CN); Yongli Hu, Shenzhen (CN); Feiran Huang, Guangzhou (CN); Pengtao Xia, Shenzhen (CN); Jingjing Guo, Guangzhou (CN); Junhong Wen, Shenzhen (CN); Senting Ma, Guangzhou (CN)

(73) Assignees: Jinan University, Guangzhou (CN); Shenzhen Lanyou Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/978,146

(22) Filed: Dec. 12, 2024

(30) Foreign Application Priority Data

Dec. 18, 2023 (CN) ......................... 202311732817.3

(51) Int. Cl.

| | |
|---|---|
| ***G08G 1/00*** | (2006.01) |
| ***G08G 1/01*** | (2006.01) |
| ***G08G 1/048*** | (2006.01) |
| ***G08G 1/14*** | (2006.01) |

(52) U.S. Cl.
CPC ........... *G08G 1/142* (2013.01); *G08G 1/0112* (2013.01); *G08G 1/048* (2013.01)

(58) Field of Classification Search
CPC ....... G08G 1/142; G08G 1/0112; G08G 1/048
See application file for complete search history.

(56) References Cited

U.S. PATENT DOCUMENTS

2022/0305735 A1* 9/2022 Cella .................... G05D 1/0221

OTHER PUBLICATIONS

Jinan University and Shenzhen Lanyou Technology Co., Ltd. (Applicants), Replacement claims (allowed) of CN202311732817.3, Jan. 30, 2024.

CNIPA, Notification to grant patent right for invention in CN202311732817.3, Feb. 26, 2024.

* cited by examiner

*Primary Examiner* — Ian Jen
(74) *Attorney, Agent, or Firm* — Hemisphere Law, PLLC; Zhigang Ma

(57) ABSTRACT

Disclosed is a method for scheduling cars at a narrow curve based on a parking space for temporary avoidance. The method includes: fusing car data obtained by laser radar and millimeter wave radar, so as to predict car states and driving trajectories of meeting cars; computing an expected meeting point of the cars through prediction of the driving trajectories of the cars; and executing, on the basis of the expected meeting point, different car avoidance strategies according to road conditions and a number of parking spaces for temporary avoidance, so as to implement car avoidance and scheduling of car meeting at the narrow curve.

13 Claims, 8 Drawing Sheets

METHOD FOR SCHEDULING CARS AT NARROW CURVE BASED ON PARKING SPACE FOR TEMPORARY AVOIDANCE

TECHNICAL FIELD

The present disclosure relates to the technical field of car control, and specifically in particular to a method for scheduling cars at a narrow curve based on a parking space for temporary avoidance.

BACKGROUND

With a vast territory, many countries have complex and diverse landforms and large mountain areas. As Chinese economy grows rapidly, mountain roads have increased to satisfy demands for daily travel and tourism development of mountain residents. However, traffic accidents occur frequently in mountain roads because of many curves, narrow roads and other problems. Many countries ensure driving security of mountain roads by widening road surfaces of curves and setting temporary avoidance points, but a problem of car scheduling at narrow curves is still worthy of attention. In a driving process, drivers generally fail to avoid each other because a meeting position of two cars is too narrow. In this case, a traffic jam is likely to occur, and even a traffic accident may occur at a meeting moment of the cars.

The Chinese patent No. 202110667345.2 discloses a traffic scheduling method for a shortcut. The method includes the following steps that shortcut car driving information, a road passing state and meeting position occupation are obtained to form state data; and the state data is analyzed and processed to obtain a full-line driving condition and an idle condition of a meeting position, and then car scheduling is implemented.

The Chinese patent No. 201810188301.X discloses a control system and method for car avoidance. The method includes the following steps that a driving path is planned by obtaining destination information input by a user, and an emergency state grade of a car asking for avoidance and a car asked to conduct avoidance on the driving path are collected; and an avoidance request is transmitted to cars asked to conduct avoidance within a certain range before the driving path through a transmission apparatus, and then an emergency passage is constructed, such that the car asking for avoidance can rapidly pass.

State data in the Chinese patent No. 202110667345.2 includes shortcut car driving information, a road passing state and meeting position occupation. During analyzing and processing of the state data, external factors such as road slopes, wind directions and weather in mountain zones are not considered. In this patent, a scheduling plan is made according to a theoretical meeting point and a planned meeting point, without consideration of whether there is a lane line in a lane and influence of a position of a temporary avoidance point on meeting cars. Thus, the traffic scheduling method for a shortcut disclosed in this patent still has a problem that the meeting cars cannot avoid each other successfully due to factors such as slope and a position of an avoidance point.

In the Chinese patent No. 201810188301.X, paths are planned and car data is collected in urban roads, and cars asked to conduct avoidance are determined and notified, such that cars asking for avoidance can rapidly pass. This method can implement successful avoidance of cars. However, it does not consider that car avoidance cannot be conducted by changing lanes on low-grade roads in mountain zones. Meanwhile, road conditions such as slope in the mountain zones can greatly influence car avoidance strategies. Thus, the patent only focuses on a problem of car avoidance on regular urban roads, and still does not solve a problem of how to avoid cars meeting at narrow curves successfully.

SUMMARY

In order to overcome defects in the prior art, an objective of the present disclosure is to provide a method for scheduling cars at a narrow curve based on a parking space for temporary avoidance, so as to implement car avoidance and scheduling of car meeting at the narrow curve.

To achieve the objective, the present disclosure uses the technical solution as follows:

A method for scheduling cars at a narrow curve based on a parking space for temporary avoidance includes:

- fusing car data obtained by laser radar and millimeter wave radar, so as to predict car states and driving trajectories of meeting cars;
- computing an expected meeting point of the cars through prediction of the driving trajectories of the cars; and
- executing, on the basis of the expected meeting point, different car avoidance strategies according to road conditions and a number of parking spaces for temporary avoidance, so as to implement car avoidance and scheduling of car meeting at the narrow curve.

Further, the fusing car data obtained by laser radar and millimeter wave radar, so as to predict car states and driving trajectories of meeting cars includes:

- predicting the car states with the car data obtained by the laser radar through Kalman filtering; and
- updating measurement of the car state with the car data obtained by the millimeter wave radar through extended Kalman filtering, changing a coordinate system through a nonlinear measurement function h(x), setting a measurement noise covariance matrix R, and computing a new jacobian matrix $H_j$, such that measurement updating is implemented.

In a prediction stage, after the car data carData collected by the laser radar is received, a predicted value $\widehat{carData}''$ of the car data is computed through a state prediction formula.

In an updating stage, a filter compares predicted car data $\widehat{carData}''$ with a measured value Z of a sensor, and conducts data fusion, such that updated car data, that is, an optimal estimated value $\widehat{carData}'_{best}$, is obtained.

After time Δt, measured values of the radar are received again, and a next round of prediction and updating is started.

Further, the state prediction formula is:

$$\widehat{carData}'' = F * \widehat{carData}' + B * u + W$$

In the formula, F denotes a state transition matrix configured to predict a next state value, $\widehat{carData}'$ denotes an optimal estimated value obtained through comprehensive prediction and measurement of the cars at a last moment, B denotes a control matrix, u denotes a control variable, and w denotes a noise term.

B*u=0 is set, and influence of acceleration and the noise term w are added, and are represented by a process noise vector noise.

That is:

$$\widehat{carData}'' = F * \widehat{carData}' + \text{noise}.$$

Further, in the updating stage, a computation mode of the optimal estimated value $\widehat{carData}'_{best}$ is:

$$\widehat{carData}'_{best}=\widehat{carData}'+K*y$$

In the formula, K denotes a Kalman gain, and y denotes a measurement residual vector.

Further, the car avoidance strategies include a car avoidance strategy in a case without lane lines and a car avoidance strategy in a case with lane lines.

Further, the car avoidance strategy in the case without lane lines includes:

determining a number of the parking spaces for temporary avoidance between two meeting cars, and executing, in response to determining that the number of the parking space for temporary avoidance is 1, an avoidance strategy I. The avoidance strategy I includes:

recording a road zone in a range of several meters before and after the parking space for temporary avoidance as an expected meeting zone expectMeet; and further determining, in response to determining that the expected meeting point predictMeet is located in the expected meeting zone expectMeet, whether a road surface is an undulant road surface; and using, in response to determining that the road surface is the undulant road surface, a downhill car as an avoiding car, and using an uphill car as a to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes. The strategy further includes: using, in response to determining that the road surface is not the undulant road surface, a car close to the parking space P for temporary avoidance as an avoiding car, and using a car at the other side as a to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

The strategy further includes: using, in response to determining that the expected meeting point predictMeet is at a left side of the expected meeting zone expectMeet, a right car as the avoiding car, and using a left car as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

The strategy further includes: using, in response to determining that the expected meeting point predictMeet is at a right side of the expected meeting zone expectMeet, a left car as the avoiding car, and using a right car as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

Further, in response to determining that the number of the parking spaces for temporary avoidance is 2, an avoidance strategy II is executed. The avoidance strategy II includes:

selecting, in response to determining that the expected meeting point predictMeet is in the expected meeting zone $expectMeet_1$, the parking space $P_1$ for temporary avoidance as a current meeting avoidance parking space P, and determining whether road surfaces of the expected meeting zone $expectMeet_1$ and around the expected meeting zone are undulant road surfaces;

selecting, in response to determining that the expected meeting point predictMeet is in the expected meeting zone $expectMeet_2$, the parking space $P_2$ for temporary avoidance as a current meeting avoidance parking space P, and determining whether road surfaces of the expected meeting zone $expectMeet_2$ and around the expected meeting zone are undulant road surfaces; and selecting, in response to determining that the expected meeting point predictMeet is at a left side of the expected meeting zone $expectMeet_1$, the parking space $P_1$ for temporary avoidance as the current meeting avoidance parking space P, using a right car as the avoiding car, and using a left car as the to-be-avoided car. The avoiding car enters a parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes.

The strategy further includes: further computing, in response to determining that the expected meeting point predictMeet is between the expected meeting zones expectMeet and $expectMeet_2$, avoidance time $T_{avoid}$;

computing time required for meeting car A and car B to reach the parking spaces $P_1$ and $P_2$ for temporary avoidance according to speeds of the meeting cars, and recording the time as $T_{AP1}$, $T_{AP2}$, $T_{BP1}$ and $T_{BP2}$, respectively; and computing the avoidance time required for the following two avoidance solutions.

Solution (1) includes: selecting the parking space $P_1$ for temporary avoidance as the current meeting avoidance parking space P, using a left car as the avoiding car, and using a right car as the to-be-avoided car. The avoiding car enters a parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes.

In this case, the avoidance time $T_{avoid}$ indicates time required for the to-be-avoided car to pass the current meeting avoidance parking space P after the avoiding car enters the current meeting avoidance parking space P:

$$T_{avoid}=T_{BP1}-(T_{AP1}+T_{extra}).$$

Solution (2) includes: selecting the parking space $P_2$ for temporary avoidance as the current meeting avoidance parking space P, using a right car as the avoiding car, and using a left car as the to-be-avoided car. The avoiding car enters the parking space P for temporary avoidance, the to-be-avoided car has to enter the expected meeting zone $expectMeet_2$ only after the avoiding car enters the parking space P for temporary avoidance, and the avoiding car has to drive out of the parking space P for temporary avoidance only after the to-be-avoided car passes.

In this case, the avoidance time $T_{avoid}$ indicates time required for the to-be-avoided car to pass the current meeting avoidance parking space P after the avoiding car enters the current meeting avoidance parking space P.

$$T_{avoid}=T_{AP2}-(T_{BP2}+T_{extra})$$

In response to determining that a parking space is at a left side of a car, a driver requires more time to enter the parking space. Thus, in the present disclosure, extra parking time of the driver due to a parking space position is recorded as $T_{extra}$.

$$T_{extra}=\begin{cases}0, & \text{a current meeting avoidance parking space } P \\ & \text{is located at a right side of a car entering a parking space} \\ t, & \text{a current meeting avoidance parking space } P \\ & \text{is located at a left side of a car entering a parking space}\end{cases}$$

$$0 \text{ min} < t < 2 \text{ mi.}$$

The solution further includes: comparing the avoidance time $T_{avoid}$ of the two solutions, and selecting the solution achieving shorter avoidance time as an avoidance strategy for current meeting.

Further, in response to determining that the road surfaces of the expected meeting zone $expectMeet_1$ or $expectMeet_2$ and around the expected meeting zone are the undulant road surfaces, the downhill car is used as the avoiding car, and the uphill car is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

In response to determining that the road surfaces of the expected meeting zone $expectMeet_1$ or $expectMeet_2$ and around the expected meeting zone are not the undulant road surfaces, a car close to the parking space P for temporary avoidance is used as the avoiding car, and a car at the other side is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

Further, the car avoidance strategy in the case with lane lines includes:

determining a number of the parking spaces for temporary avoidance between two meeting cars, and executing, in response to determining that the number of the parking space for temporary avoidance is 1, an avoidance strategy III. The avoidance strategy III includes:

using, no matter where the expected meeting point predictMeet is located, a car close to the parking space P for temporary avoidance as the avoiding car, and using a car at the other side as the to-be-avoided car. The avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

Further, in response to determining that the number of the parking spaces for temporary avoidance is 2, whether the parking spaces for temporary avoidance are located at a same side of a road is determined.

In response to determining that the parking spaces for temporary avoidance are located at the same side of the road, an avoidance strategy IV is executed. The avoidance strategy IV includes:

selecting, in response to determining that the expected meeting point predictMeet is in the expected meeting zone $expectMeet_1$ or at a left side of the expected meeting zone $expectMeet_1$, the parking space $P_1$ for temporary avoidance as the current meeting avoidance parking space P, using a car located at a same side as the current meeting avoidance parking space P as the avoiding car, and using a car at the other side as the to-be-avoided car. The avoiding car enters the current meeting avoidance parking space P, the to-be-avoided car has to enter the expected meeting zone $expectMeet_1$ only after the avoiding car enters the current meeting avoidance parking space P, and the avoiding car has to drive out of the current meeting avoidance parking space P only after the to-be-avoided car passes.

The strategy further includes: selecting, in response to determining that the expected meeting point predictMeet is at a right side of the expected meeting zone $expectMeet_1$, the parking space $P_2$ for temporary avoidance as the current meeting avoidance parking space P, using a car located at a same side as the current meeting avoidance parking space P as the avoiding car, and using a car at the other side as the to-be-avoided car. The avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

In response to determining that the parking spaces for temporary avoidance are located at different sides of the road, an avoidance strategy V is executed. The avoidance strategy V includes:

selecting, in response to determining that the expected meeting point predictMeet is in the expected meeting zone $expectMeet_1$ or at a left side of the expected meeting zone $expectMeet_1$, the parking space $P_1$ for temporary avoidance as the current meeting avoidance parking space P, using a car located at a same side as the current meeting avoidance parking space P as the avoiding car, and using a car at the other side as the to-be-avoided car. The avoiding car enters the current meeting avoidance parking space P, the to-be-avoided car has to enter the expected meeting zone $expectMeet_1$ only after the avoiding car enters the current meeting avoidance parking space P, and the avoiding car has to drive out of the current meeting avoidance parking space P only after the to-be-avoided car passes.

The strategy further includes: selecting, in response to determining that the expected meeting point predictMeet is in the expected meeting zone $expectMeet_2$ or at a right side of the expected meeting zone $expectMeet_2$, the parking space $P_2$ for temporary avoidance as the current meeting avoidance parking space P, using a car located at a same side as the current meeting avoidance parking space P as the avoiding car, and using a car at the other side as the to-be-avoided car. The avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

The strategy further includes: computing, in response to determining that the expected meeting point predictMeet is between the expected meeting zone $expectMeet_1$ and the expected meeting zone $expectMeet_2$, avoidance time $T_{avoid}$. The step includes:

computing time required for meeting car A and car B to reach the parking spaces $P_1$ and $P_2$ for temporary avoidance according to speeds of the meeting cars, and recording the time as $T_{AP1}$, $T_{AP2}$, $T_{BP1}$ and $T_{BP2}$, respectively; and computing the avoidance time required for the following two avoidance solutions.

Solution (1): selecting the parking space $P_1$ for temporary avoidance as the current meeting avoidance parking space P, using a car located at a same side as the current meeting avoidance parking space P as the avoiding car, and using a car at the other side as the to-be-avoided car. The avoiding car enters the parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes.

In response to determining that the current meeting avoidance parking space P is located at a left side of the avoiding car, the avoidance time $T_{avoid}$ indicates waiting time required for the to-be-avoided car when the avoiding car enters the current meeting avoidance parking space P:

$$T_{avoid}=(T_{BP1}+T_{extra})-T_{AP1}$$

In response to determining that the current meeting avoidance parking space P is located at a right side of the avoiding car, the avoidance time $T_{avoid}$ indicates time required for the to-be-avoided car to pass the current meeting avoidance parking space P after the avoiding car enters the current meeting avoidance parking space P:

$$T_{avoid}=T_{BP1}-(T_{AP1}+T_{extra})$$

Solution (2): selecting the parking space $P_2$ for temporary avoidance as the current meeting avoidance parking space P, using a car located at a same side as the current meeting avoidance parking space P as the avoiding car, and using a car at the other side as the to-be-avoided car. The avoiding car enters the parking space P for temporary avoidance, the to-be-avoided car has to enter the expected meeting zone $expectMeet_2$ only after the avoiding car enters the parking space P for temporary avoidance, and the avoiding car has to drive out of the parking space P for temporary avoidance only after the to-be-avoided car passes.

In response to determining that the current meeting avoidance parking space P is located at a left side of the avoiding car, the avoidance time $T_{avoid}$ indicates waiting time required for the to-be-avoided car when the avoiding car enters the current meeting avoidance parking space P.

$$T_{avoid}=(T_{AP2}+T_{extra})-T_{BP2}$$

In response to determining that the current meeting avoidance parking space P is located at a right side of the avoiding car, the avoidance time $T_{avoid}$ indicates time required for the to-be-avoided car to pass the current meeting avoidance parking space P after the avoiding car enters the current meeting avoidance parking space P.

$$T_{avoid}=T_{AP2}-(T_{BP2}+T_{extra})$$

The solution further includes: recording, in response to determining that the parking space is at the left side of the car, parking time, increased due to a parking space position, of a driver as $T_{extra}$, where $$T_{extra}=\begin{cases}0, & \text{a current meeting avoidance parking space } P \text{ is located at a right side of a car entering a parking space}\\ t, & \text{a current meeting avoidance parking space } P \text{ is located at a left side of a car entering a parking space}\end{cases}$$

$$0\ \text{min} < t < 2\ \text{mi}.$$

The solution further includes: comparing the avoidance time $T_{avoid}$ for two cases in the two solutions, and selecting the solution achieving shorter avoidance time as an avoidance strategy for current meeting.

Compared with the prior art, the present disclosure has the following beneficial effects:

According to the present disclosure, fused car state data is applied to a narrow curve avoidance strategy, such that the method for scheduling cars at a narrow curve based on a parking space for temporary avoidance is implemented. On one hand, frequency of traffic accidents at continuous curves is reduced, and life and property security of people in the cars is ensured; and on the other hand, the present disclosure has characteristics of low cost and high degree of automation, such that intelligent unified management oriented development of car and infrastructure cooperation is promoted.

DETAILED DESCRIPTION OF THE EMBODIMENTS

Embodiment

A technical solution of the present disclosure will be further described below with reference to the accompanying drawings and embodiments.

A main technical principle of a method for scheduling cars at a narrow curve based on a parking space for temporary avoidance according to the present disclosure is as follows: firstly, car data obtained by laser radar and millimeter wave radar is fused, and an optimal estimation of a car driving state is obtained, so as to predict car states and trajectories of meeting cars. Secondly, an expected meeting point of the cars is computed through prediction of the driving trajectories of the cars. Then, different car avoidance strategies are executed according to road conditions and a number of parking spaces for temporary avoidance, so as to implement car avoidance and scheduling of car meeting at the narrow curve. Passing efficiency at mountain curves is ensured while traffic accidents are reduced.

Thus, compared with the prior art, a method for scheduling cars at a narrow curve based on a roadside parking space according to the present disclosure has the following technical advantages.

First, in the method of the present disclosure, the car data is collected with the laser radar and the millimeter wave radar, and collected car state data is fused. On one hand, advantages of high resolution, strong anti-interference performance and small size of the laser radar are used. On the other hand, the car data obtained by the millimeter wave radar is fused, such that adverse effects such as incapability of recognition caused by bad weather are reduced, and further the car states and the trajectories are predicted more accurately.

Second, according to the present disclosure, different car avoidance strategies are executed according to the road conditions and the number of the parking spaces for temporary avoidance, and in a case of refining a real road scene, the avoidance strategies are formulated according to different road scenes, so as to implement efficient car avoidance of car meeting at the narrow curve. Traffic efficiency is ensured while traffic accidents are reduced.

An implementation process of the method of the present disclosure will be described in detail below.

Figure 1:
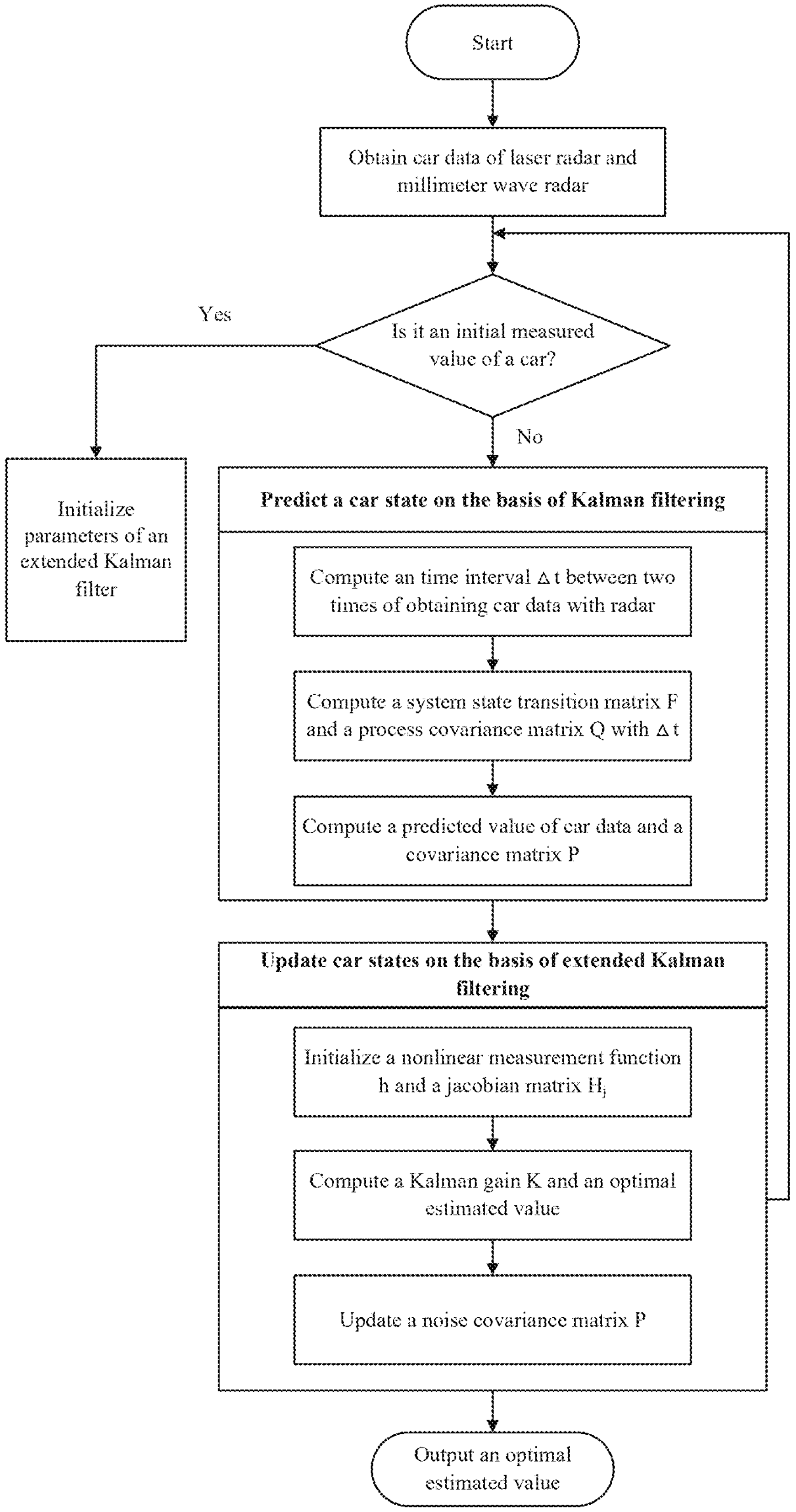
FIG. 1 is a flow diagram of car driving state prediction based on multi-sensor data fusion.

Step 1, an optimal estimation of a car driving state is obtained. As shown in FIG. 1, the step specifically includes the following steps:

S11, a measured value is initialized.

An initial measured value is obtained through laser radar, and car data carData, is initialized on the basis of the initial measured value.

$$carData_0 = \begin{bmatrix} p_{x0} \\ p_{y0} \\ v_{x0} \\ v_{y0} \end{bmatrix}$$

$p_{x0}$ and $p_{y0}$ denote car positions represented by Cartesian coordinates in an initial stage respectively. $v_{x0}$ and $v_{y0}$ denote car speeds represented by Cartesian coordinates in the initial stage respectively.

S12, car states are predicted on the basis of Kalman filtering.

(1) State Prediction Formula

Considering a linear motion model of cars in reality:

$$\begin{cases} p'_x = p_x + v_x * \Delta t + \frac{\Delta t^2}{2} * a_x \\ p'_y = p_y + v_y * \Delta t + \frac{\Delta t^2}{2} * a_y \\ v'_x = v_x + a_x * \Delta t \\ v'_y = v_y + a_y * \Delta t \end{cases}$$

a state transition matrix F configured to predict a next state value, a control matrix B and a control variable u are obtained, and $$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix}, B = \begin{bmatrix} \frac{\Delta t^2}{2} \\ \frac{\Delta t^2}{2} \\ \Delta t \\ \Delta t \end{bmatrix}, u = \begin{bmatrix} a_x \\ a_y \\ a_x \\ a_y \end{bmatrix}.$$

Further, the following state prediction formula may be obtained:

$$\begin{bmatrix} p'_x \\ p'_y \\ v'_x \\ v'_y \end{bmatrix} = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} * \begin{bmatrix} p_x \\ p_y \\ v_x \\ v_y \end{bmatrix} + \begin{bmatrix} \frac{\Delta t^2}{2} \\ \frac{\Delta t^2}{2} \\ \Delta t \\ \Delta t \end{bmatrix} * \begin{bmatrix} a_x \\ a_y \\ a_x \\ a_y \end{bmatrix} + w$$

That is:

$$\widehat{carData}'' = F * \widehat{carData}' + B * u + W.$$

$\widehat{carData}'$ denotes an optimal estimated value obtained through comprehensive prediction and measurement of the cars at a last moment (a moment t−1). The estimated value includes four values $p_x$, $p_y$, $v_x$ and $v_y$, which are all based on Cartesian coordinates. $\widehat{carData}''$ denotes a car state at a moment t predicted on the basis of the optimal estimated value $\widehat{carData}'$ at a last moment (a moment t−1). Considering that car motion may be influenced by external factors, a noise term w further needs to be added.

For the sake of driving security at mountain roads, it is assumed that the cars are basically in a constant speed state at continuous curves, that is, a constant speed model is used. As B*u in the state prediction formula denotes influence of acceleration on position updating, a state transition formula in the present disclosure is set as B*u=0, and the influence of the acceleration and the noise term w are added, and are represented by a process noise vector noise.

That is:

$$\widehat{carData}'' = F * \widehat{carData}' + \text{noise}.$$

(2) Transfer Formula of Uncertainty at Each Moment

As the influence of the acceleration is added to the noise term, noise can be expressed as follows:

$$\text{noise} = \begin{bmatrix} \text{noise}_{px} \\ \text{noise}_{py} \\ \text{noise}_{vx} \\ \text{noise}_{vy} \end{bmatrix} = \begin{bmatrix} \frac{\Delta t^2}{2} \\ \frac{\Delta t^2}{2} \\ \Delta t \\ \Delta t \end{bmatrix} * \begin{bmatrix} a_x \\ a_y \\ a_x \\ a_y \end{bmatrix} = \begin{bmatrix} \frac{\Delta t^2}{2} & 0 \\ 0 & \frac{\Delta t^2}{2} \\ \Delta t & 0 \\ 0 & \Delta t \end{bmatrix} * \begin{bmatrix} a_x \\ a_y \end{bmatrix} = G * a$$

Δt denotes a time difference between two Kalman filtering steps. Because of the constant speed model, mean values of acceleration $a_x$ and acceleration $a_y$ are both 0, and standard deviations of the values are $\sigma_{ax}$ and $\sigma_{ay}$ respectively. Meanwhile, $a_x$ and $a_y$ are not related to each other, that is, $\sigma_{axy}=0$.

A process covariance matrix Q is defined as follows:

$$Q = E[\text{noise} * \text{noise}^T] = E[G * a * a^T * G^T] =$$

$$G * E[a * a^T] * G^T = G * Q_v * G^T = G * \begin{bmatrix} \sigma_{ax}^2 & \sigma_{axy} \\ \sigma_{axy} & \sigma_{ay}^2 \end{bmatrix} * G^T =$$

$$G * \begin{bmatrix} \sigma_{ax}^2 & 0 \\ 0 & \sigma_{ay}^2 \end{bmatrix} * G^T = \begin{bmatrix} \frac{\Delta t^4}{4}\sigma_{ax}^2 & 0 & \frac{\Delta t^3}{2}\sigma_{ax}^2 & 0 \\ 0 & \frac{\Delta t^4}{4}\sigma_{ay}^2 & 0 & \frac{\Delta t^3}{2}\sigma_{ay}^2 \\ \frac{\Delta t^3}{2}\sigma_{ax}^2 & 0 & \Delta t^2\sigma_{ax}^2 & 0 \\ 0 & \frac{\Delta t^3}{2}\sigma_{ay}^2 & 0 & \Delta t^2\sigma_{ay}^2 \end{bmatrix}$$

It can be found that as time goes on, the uncertainty of car's position and speed increases, so the process covariance matrix Q includes a lot of Δt. Thus, the uncertainty of a state covariance matrix P is increased.

The transfer formula of uncertainty at each moment is as follows:

$$P' = F * P * F^T + Q$$

S13, the car states are updated on the basis of extended Kalman filtering.

Although the laser radar may provide more accurate car data, the car data may be greatly influenced by bad weather. Thus, as the millimeter wave radar is capable of penetrating fog, smoke and dust, the present disclosure fuses the measured value of the millimeter wave radar and the measured value of the laser radar, and further accurately predicts the car positions.

(1) Data Processing

Firstly, a nonlinear measurement function h(x) is determined, and is configured to convert predicted positions and speeds based on Cartesian coordinates into car distances, angles and distance change rates based on polar coordinates.

$$h(x) = \begin{bmatrix} \rho \\ \varphi \\ \dot{\rho} \end{bmatrix} = \begin{bmatrix} \sqrt{p_x'^2 + p_y'^2} \\ \arctan(p_y'/p_x' \\ \frac{p_x'v_x' + p_y'v_y'}{\sqrt{p_x'^2 + p_y'^2}} \end{bmatrix}$$

Secondly, on the basis of extended Kalman filtering, a nonlinear function h(x) is approximately linearized through first-order Taylor expansion, and its distribution is Gaussian distribution. A derivative of h(x) to x is referred to as a jacobian matrix $H_j$.

$$h(x) \approx h(\mu) + \frac{\partial h(\mu)}{\partial x}(x - \mu)$$

$$H_j = \begin{bmatrix} \frac{\partial \rho}{\partial p_x} & \frac{\partial \rho}{\partial p_y} & \frac{\partial \rho}{\partial v_x} & \frac{\partial \rho}{\partial v_y} \\ \frac{\partial \varphi}{\partial p_x} & \frac{\partial \varphi}{\partial p_y} & \frac{\partial \varphi}{\partial v_x} & \frac{\partial \varphi}{\partial v_y} \\ \frac{\partial \dot{\rho}}{\partial p_x} & \frac{\partial \dot{\rho}}{\partial p_y} & \frac{\partial \dot{\rho}}{\partial v_x} & \frac{\partial \dot{\rho}}{\partial v_y} \end{bmatrix} =$$

-continued $$\begin{bmatrix} \frac{p_x}{\sqrt{p_x^2 + p_y^2}} & \frac{p_y}{\sqrt{p_x^2 + p_y^2}} & 0 & 0 \\ -\frac{p_y}{p_x^2 + p_y^2} & \frac{p_x}{p_x^2 + p_y^2} & 0 & 0 \\ \frac{p_y(v_x p_y - v_y p_x)}{(p_x^2 + p_y^2)^{3/2}} & \frac{p_x(v_y p_x - v_x p_y)}{(p_x^2 + p_y^2)^{3/2}} & \frac{p_x}{\sqrt{p_x^2 + p_y^2}} & \frac{p_x}{\sqrt{p_x^2 + p_y^2}} \end{bmatrix}$$

(2) Measurement Updating

1) An Observation Matrix is Determined as Required.

① A measurement matrix Z includes measured values ρ, φ and $\dot{\rho}$ of positions, that is, $$Z = \begin{bmatrix} \rho \\ \varphi \\ \dot{\rho} \end{bmatrix}.$$

② A measurement residual vector y indicates a residual error between an actual measured value and a predicted estimated value.

$$y = Z - h(\text{carData}')$$

③ A measurement noise covariance matrix R indicates an error between the actual measured value and the measured value, that is, uncertainty in sensor measurement, and its parameters may be provided by a sensor manufacturer.

2) State Updating

① A Kalman gain is computed.

A measurement residual covariance matrix S indicates an error between a theoretical estimated value and the measured value.

$$S = H_j * P' * H_j^T + R$$

The Kalman gain K is configured to measure a size between predicted state covariance and observed state covariance, and then determine how to give a weight.

$$K = P' * H_j^T * S^{-1} = \frac{P' * H_j^T}{H_j * P' * H_j^T + R}$$

② An optimal estimated value is computed.

$$\widehat{carData'}_{best} = \widehat{carData'}' + K * y$$

③ The noise covariance matrix is updated.

$$P = (I - K * H)P'$$

That is, Step 1, firstly, on the basis of the car data obtained by the laser radar, the car state is predicted through Kalman filtering. Then, measurement of the car state is updated with the car data obtained by the millimeter wave radar through extended Kalman filtering, a coordinate system is changed through a nonlinear measurement function h(x), a measurement noise covariance matrix R is set, and a new jacobian matrix $H_j$ is computed, such that measurement updating is implemented.

In a prediction stage, after the car data carData collected by the laser radar is received, a predicted value $\widehat{carData'}'$ of the car data is computed through the state prediction formula in S12.

In an updating stage, a filter compares predicted car data $\widehat{carData'}'$ with a measured value Z of a sensor, and conducts data fusion according to S13, such that updated car data, that is, an optimal estimated value $\widehat{carData}'_{best}$, is obtained. According to uncertainty (the Kalman gain K) of each value, a Kalman filter may decide to give more weights to the predicted car data or measured car data.

After time Δt, measured values of the radar are received again, and a next round of prediction and updating is started through an algorithm.

Step 2, avoidance of meeting cars at the narrow curve is conducted.

S21, speeds of two meeting cars measured by the radar are recorded as $v_A$ and $v_B$ respectively. Meanwhile, car trajectories are predicted through step 1, and an expected meeting point of the two cars is computed and recorded as predictMeet.

S22, avoidance of the meeting cars is conducted according to the road conditions and a position of the expected meeting point.

Whether there is a lane line is determined according to the road conditions. If not, step 3 is switched to, and otherwise, step 4 is switched to.

Step 3, a car avoidance strategy in a case without lane lines is executed.

S31, the number of parking spaces for temporary avoidance between two meeting cars is determined.

In response to determining that the number of the parking space for temporary avoidance is 1, S32 is switched to.

In response to determining that the number of the parking spaces for temporary avoidance is 2, S33 is switched to.

S32, in a case with a single parking space and without lane lines, an avoidance strategy I is executed.

Figure 2:
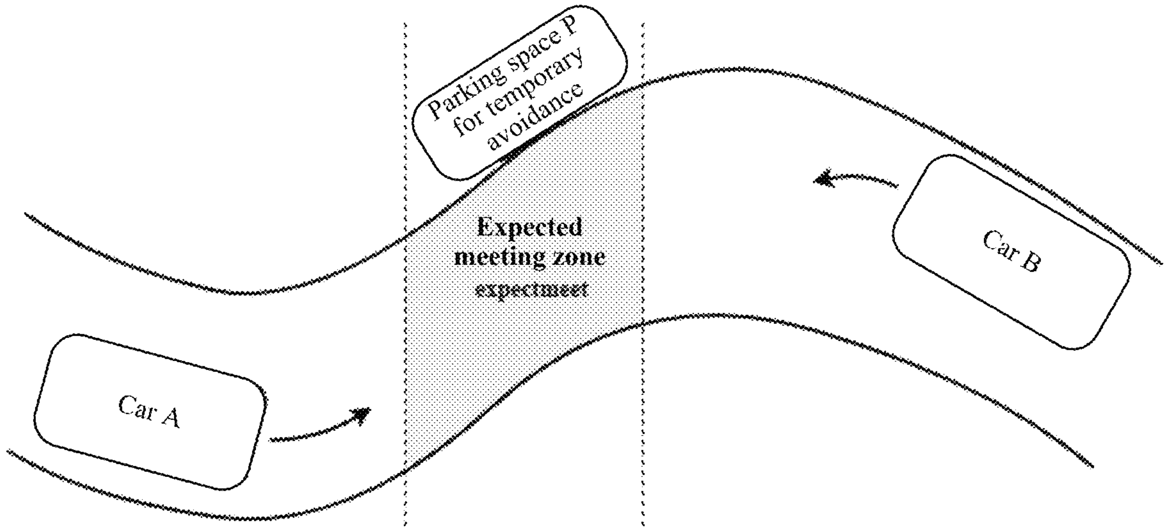
FIG. 2 is a schematic diagram of car avoidance in a case with a single parking space and without lane lines.

As shown in FIG. 2, a road zone in a range of 50 m before and after the parking space for temporary avoidance is recorded as an expected meeting zone expectMeet.

(1) In response to determining that the expected meeting point predictMeet is located in the expected meeting zone expectMeet, whether a road surface is an undulant road surface is further determined. In response to determining the road surface is the undulant road surface, a downhill car is used as an avoiding car, and an uphill car is used as a to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes. In response to determining that the road surface is not the undulant road surface, a car close to the parking space P for temporary avoidance is used as the avoiding car, and a car at the other side is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

(2) In response to determining that the expected meeting point predictMeet is at a left side of the expected meeting zone expectMeet, a right car is used as the avoiding car, and a left car is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

(3) In response to determining that the expected meeting point predictMeet is at a right side of the expected meeting zone expectMeet, a left car is used as the avoiding car, and a right car is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

S33, in a case with double parking spaces without lane lines, an avoidance strategy II is executed.

(1) In response to determining that the expected meeting point predictMeet is in the expected meeting zone expectMeet$_1$, the parking space $P_1$ for temporary avoidance is selected as a current meeting avoidance parking space P, and whether road surfaces of the expected meeting zone expectMeet$_1$ and around the expected meeting zone are undulant road surfaces is determined. In response to determining the road surface is the undulant road surface, a downhill car is used as an avoiding car, and an uphill car is used as a to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes. In response to determining that the road surface is not the undulant road surface, a car close to the parking space P for temporary avoidance is used as the avoiding car, and a car at the other side is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

(2) In response to determining that the expected meeting point predictMeet is in the expected meeting zone expectMeet$_2$, the parking space $P_2$ for temporary avoidance is selected as a current meeting avoidance parking space P, and whether road surfaces of the expected meeting zone expectMeet$_2$ and around the expected meeting zone are undulant road surfaces is determined. In response to determining the road surface is the undulant road surface, a downhill car is used as an avoiding car, and an uphill car is used as a to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes. In response to determining that the road surface is not the undulant road surface, a car close to the parking space P for temporary avoidance is used as the avoiding car, and a car at the other side is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

(3) In response to determining that the expected meeting point predictMeet is at a left side of the expected meeting zone expectMeet$_1$, the parking space $P_1$ for temporary avoidance is selected as the current meeting avoidance parking space P, a right car is used as the avoiding car, and a left car is used as the to-be-avoided car. The avoiding car enters a parking space P for temporary avoidance, the to-be-avoided car has to enter the expected meeting zone expectMeet$_1$ only after the avoiding car enters the parking space P for temporary avoidance, and the avoiding car has to drive out of the parking space P for temporary avoidance only after the to-be-avoided car passes.

(4) In response to determining that the expected meeting point predictMeet is at a right side of the expected meeting zone expectMeet$_2$, the parking space $P_2$ for temporary avoidance is selected as the current meeting avoidance parking space P, a left car is used as the avoiding car, and a right car is used as the to-be-avoided car. The avoiding car enters a parking space P for temporary avoidance, the to-be-avoided car has to enter the expected meeting zone expectMeet$_2$ only after the avoiding car enters the parking space P for temporary avoidance, and the avoiding car has to drive out of the parking space P for temporary avoidance only after the to-be-avoided car passes.

(5) In response to determining that the expected meeting point predictMeet is between the expected meeting zones expectMeet$_1$ and expectMeet$_2$, avoidance time $T_{avoid}$ is further computed.

Firstly, the speeds of the meeting cars may be obtained through step 1, and time required for meeting car A and car B to reach the parking spaces $P_1$ and $P_2$ for temporary avoidance may be computed and recorded as $T_{AP1}$, $T_{AP2}$, $T_{BP1}$ and $T_{BP2}$, respectively.

Secondly, the avoidance time required for the following two avoidance solutions is computed.

Figure 3:
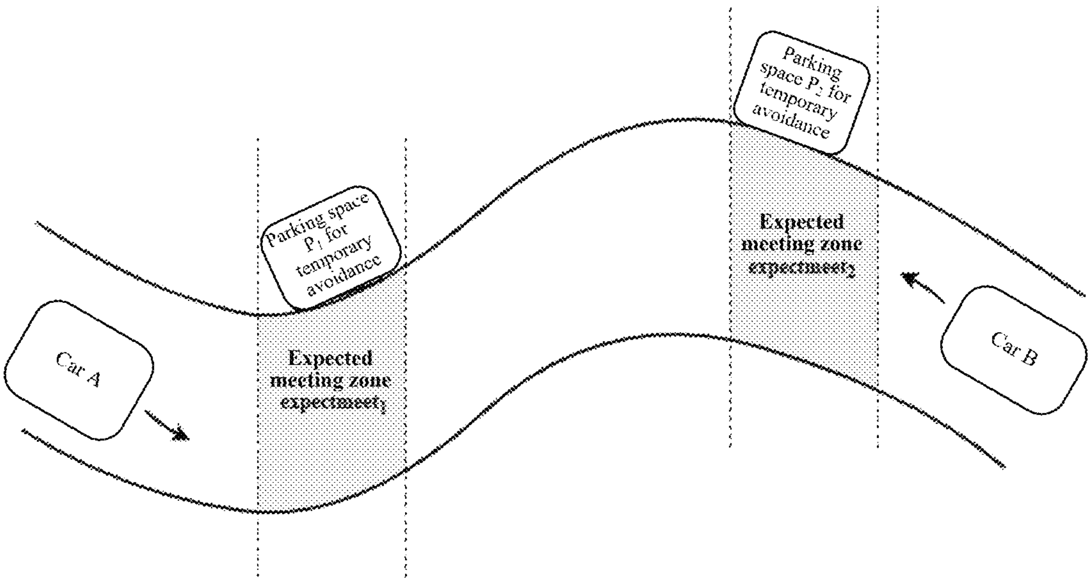
FIG. 3 is a schematic diagram of car avoidance in a case with double parking spaces at a same side and without lane lines.
Figure 4:
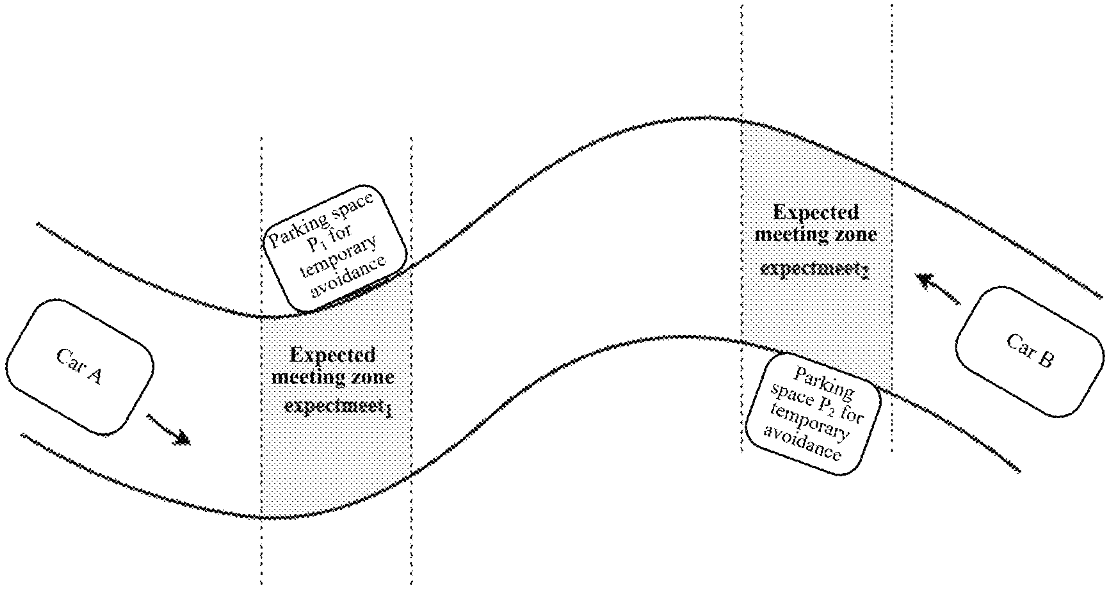
FIG. 4 is a schematic diagram of car avoidance in a case with double parking spaces at different sides and without lane lines.

Solution (1): as shown in FIGS. 3-4, the parking space $P_1$ for temporary avoidance is selected as the current meeting avoidance parking space P, a left car is used as the avoiding car, and a right car is used as the to-be-avoided car. The avoiding car enters a parking space P for temporary avoidance, the to-be-avoided car has to enter the expected meeting zone expectMeet$_1$ only after the avoiding car enters the parking space P for temporary avoidance, and the avoiding car has to drive out of the parking space P for temporary avoidance only after the to-be-avoided car passes.

In this case, the avoidance time $T_{avoid}$ indicates time required for a to-be-avoided car B to pass the current meeting avoidance parking space P after an avoiding car A enters the current meeting avoidance parking space P.

$$T_{avoid}=T_{BP1}-(T_{AP1}+T_{extra})$$

Solution (2): as shown in FIGS. 3-4, the parking space $P_2$ for temporary avoidance is selected as the current meeting avoidance parking space P, a right car is used as an avoiding car, and a left car is used as a to-be-avoided car. The avoiding car enters a parking space P for temporary avoidance, the to-be-avoided car has to enter the expected meeting zone expectMeet$_2$ only after the avoiding car enters the parking space P for temporary avoidance, and the avoiding car has to drive out of the parking space P for temporary avoidance only after the to-be-avoided car passes.

In this case, the avoidance time $T_{avoid}$ indicates time required for a to-be-avoided car A to pass the current meeting avoidance parking space P after an avoiding car B enters the current meeting avoidance parking space P.

$$T_{avoid}=T_{AP2}-(T_{BP2}+T_{extra})$$

In response to determining that a parking space is at a left side of a car, a driver requires more time to enter the parking space. Thus, in the present disclosure, extra parking time of the driver due to a parking space position is recorded as $T_{extra}$.

$$T_{extra}=\begin{cases}0, & \text{a current meeting avoidance parking space } P \text{ is located at a right side of a car entering a parking space}\\ t, & \text{a current meeting avoidance parking space } P \text{ is located at a left side of a car entering a parking space}\end{cases}$$

$$0 \text{ min} < t < 2 \text{ mi.}$$

Finally, the avoidance time $T_{avoid}$ of the two solutions is compared, and the solution achieving shorter avoidance time is selected as an avoidance strategy for current meeting. Step 4, a car avoidance strategy in a case with lane lines is executed.

S41, the number of parking spaces for temporary avoidance between two meeting cars is determined.

(1) In response to determining that the number of the parking space for temporary avoidance is 1, S42 is switched to.

(2) In response to determining that the number of the parking spaces for temporary avoidance is 2, whether the parking spaces for temporary avoidance are located at a same side of a road is determined. In response to determining that the parking spaces for temporary avoidance are located at the same side of the road, S43 is switched to. In response to determining that the parking spaces for temporary avoidance are located at different sides of the road, S44 is switched to.

S42, in a case with a single parking space and with lane lines, an avoidance strategy III is executed.

Figure 5:
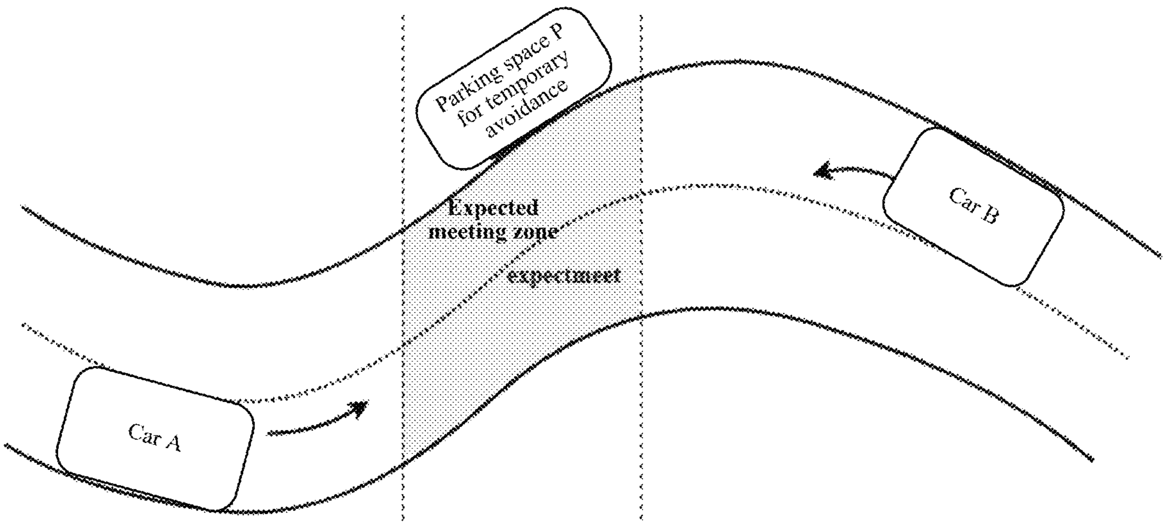
FIG. 5 is a schematic diagram of car avoidance in a case with a single parking space and lane lines.

As shown in FIG. 5, no matter where the expected meeting point predictMeet is located, a car close to the parking space P for temporary avoidance is used as the avoiding car, and a car at the other side is used as the to-be-avoided car. The avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

Figure 6:
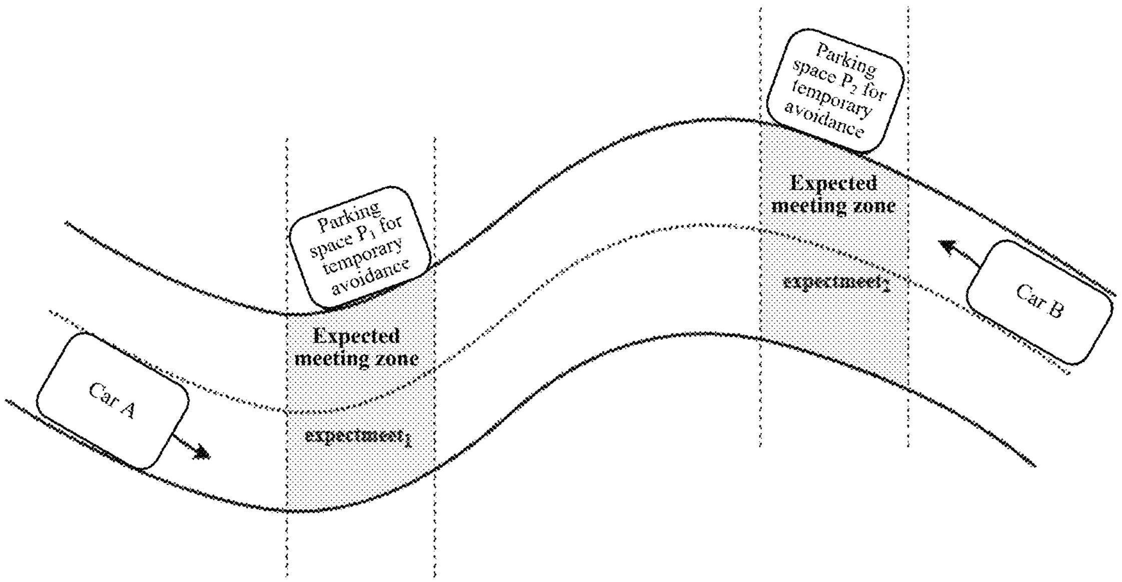
FIG. 6 is a schematic diagram of car avoidance in a case with a single parking space and lane lines.

S43, in a case with double parking spaces at a same side and with lane lines, an avoidance strategy IV is executed. As shown in FIG. 6:

(1) In response to determining that the expected meeting point predictMeet is in the expected meeting zone expectMeet$_1$ or at a left side of the expected meeting zone expectMeet$_1$, the parking space $P_1$ for temporary avoidance is selected as the current meeting avoidance parking space P, a car located at a same side as the current meeting avoidance parking space P is used as the avoiding car, and a car at the other side is used as the to-be-avoided car. The avoiding car enters the current meeting avoidance parking space P, the to-be-avoided car has to enter the expected meeting zone expectMeet$_1$ only after the avoiding car enters the current meeting avoidance parking space P, and the avoiding car has to drive out of the current meeting avoidance parking space P only after the to-be-avoided car passes.

(2) In response to determining that the expected meeting point predictMeet is at a right side of the expected meeting zone expectMeet$_1$, the parking space $P_2$ for temporary avoidance is selected as the current meeting avoidance parking space P, a car located at a same side as the current meeting avoidance parking space P is used as the avoiding car, and a car at the other side is used as the to-be-avoided car. The avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

S44, in a case with double parking spaces at different sides and with lane lines, an avoidance strategy V is executed.

(1) In response to determining that the expected meeting point predictMeet is in the expected meeting zone $expectMeet_1$ or at a left side of the expected meeting zone $expectMeet_1$, the parking space $P_1$ for temporary avoidance is selected as the current meeting avoidance parking space P, a car located at a same side as the current meeting avoidance parking space P is used as the avoiding car, and a car at the other side is used as the to-be-avoided car. The avoiding car enters the current meeting avoidance parking space P, the to-be-avoided car has to enter the expected meeting zone $expectMeet_1$ only after the avoiding car enters the current meeting avoidance parking space P, and the avoiding car has to drive out of the current meeting avoidance parking space P only after the to-be-avoided car passes.

(2) In response to determining that the expected meeting point predictMeet is in the expected meeting zone $expectMeet_2$ or at a right side of the expected meeting zone $expectMeet_2$, the parking space $P_2$ for temporary avoidance is selected as the current meeting avoidance parking space P, a car located at a same side as the current meeting avoidance parking space P is used as the avoiding car, and a car at the other side is used as the to-be-avoided car. The avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

(3) In response to determining that the expected meeting point predictMeet is between the expected meeting zone $expectMeet_1$ and the expected meeting zone $expectMeet_2$, avoidance time $T_{avoid}$ is computed.

Firstly, the speeds of the meeting cars may be obtained through step 1, and time required for meeting car A and car B to reach the parking spaces $P_1$ and $P_2$ for temporary avoidance may be computed and recorded as $T_{AP1}$, $T_{AP2}$, $T_{BP1}$ and $T_{BP2}$, respectively.

Secondly, the avoidance time required for the following two avoidance solutions is computed.

Solution (1): the parking space $P_1$ for temporary avoidance is selected as the current meeting avoidance parking space P, a car located at a same side as the current meeting avoidance parking space P is used as the avoiding car, and a car at the other side is used as the to-be-avoided car. The avoiding car enters a parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes.

Figure 7:
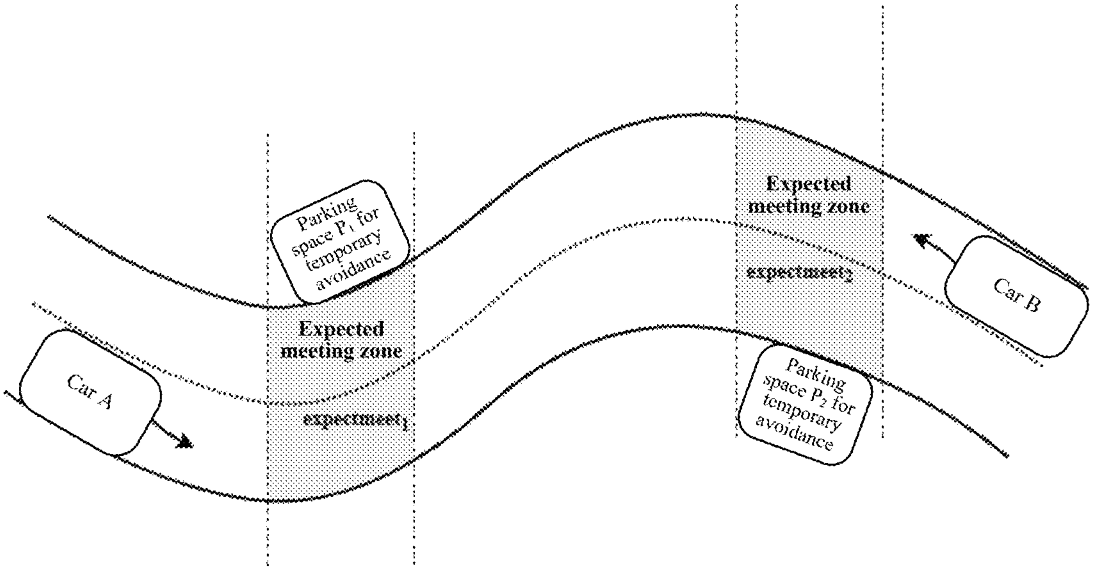
FIG. 7 is a schematic diagram of car avoidance in a first case with double parking spaces at different sides and with lane lines.

As shown in FIG. 7, in response to determining that the current meeting avoidance parking space P is located at a left side of the avoiding car, the avoidance time $T_{avoid}$ indicates waiting time required for a to-be-avoided car A when an avoiding car B enters the current meeting avoidance parking space P.

$$T_{avoid}=(T_{BP1}+T_{extra})-T_{AP1}$$

Figure 8:
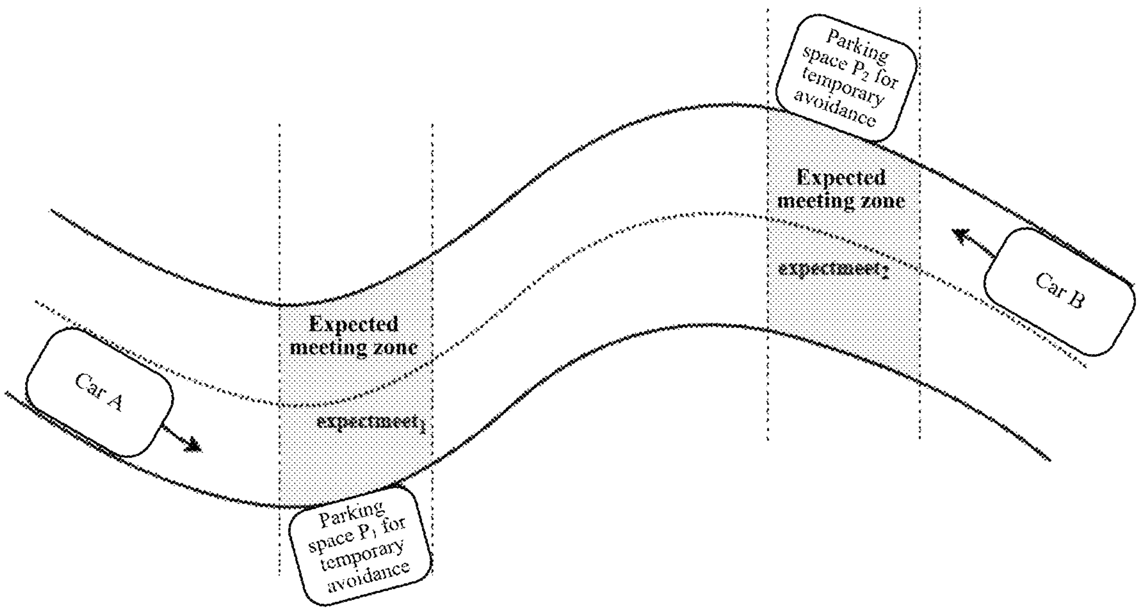
FIG. 8 is a schematic diagram of car avoidance in a second case with double parking spaces at different sides and with lane lines.

As shown in FIG. 8, in response to determining that the current meeting avoidance parking space P is located at a right side of the avoiding car, the avoidance time $T_{avoid}$ indicates time required for a to-be-avoided car B to pass the current meeting avoidance parking space P after an avoiding car A enters the current meeting avoidance parking space P.

$$T_{avoid}=T_{BP1}-(T_{AP1}+T_{extra})$$

Solution (2): the parking space $P_2$ for temporary avoidance is selected as the current meeting avoidance parking space P, a car located at a same side as the current meeting avoidance parking space P is used as the avoiding car, and a car at the other side is used as the to-be-avoided car. The avoiding car enters a parking space P for temporary avoidance, the to-be-avoided car has to enter the expected meeting zone $expectMeet_2$ only after the avoiding car enters the parking space P for temporary avoidance, and the avoiding car has to drive out of the parking space P for temporary avoidance only after the to-be-avoided car passes.

As shown in FIG. 7, in response to determining that the current meeting avoidance parking space P is located at a left side of the avoiding car, the avoidance time $T_{avoid}$ indicates waiting time required for a to-be-avoided car B when an avoiding car A enters the current meeting avoidance parking space P.

$$T_{avoid}=(T_{AP2}+T_{extra})-T_{BP2}$$

As shown in FIG. 8, in response to determining that the current meeting avoidance parking space P is located at a right side of the avoiding car, the avoidance time $T_{avoid}$ indicates time required for a to-be-avoided car A to pass the current meeting avoidance parking space P after an avoiding car B enters the current meeting avoidance parking space P.

$$T_{avoid}=T_{AP2}-(T_{BP2}+T_{extra})$$

In response to determining that a parking space is at a left side of a car, a driver requires more time to enter the parking space. Thus, in the present disclosure, parking time of the driver increased due to a parking space position is recorded as $T_{extra}$.

$$T_{extra}=\begin{cases}0, & \text{a current meeting avoidance parking space } P \text{ is located at a right side of a car entering a parking space}\\ t, & \text{a current meeting avoidance parking space } P \text{ is located at a left side of a car entering a parking space}\end{cases}$$

$$0 \text{ min} < t < 2 \text{ mi.}$$

Finally, the avoidance time $T_{avoid}$ for two cases in the two solutions is compared, and the solution achieving shorter avoidance time is selected as an avoidance strategy for current meeting.

The above embodiments are only for explaining technical concepts and characteristics of the present disclosure, aim to enable those of ordinary skill in the art to know the content of the present disclosure and implement it, and are not intended to limit the protection scope of the present disclosure. All equivalent changes or modifications made according to the essence of the present disclosure should fall within the protection scope of the present disclosure.

What is claimed is:

1. A method for scheduling cars at a narrow curve based on a parking space for temporary avoidance, comprising:

fusing car data obtained by laser radar and millimeter wave radar, so as to predict car states and driving trajectories of meeting cars;

computing an expected meeting point of the cars through prediction of the driving trajectories of the cars; and executing, on the basis of the expected meeting point, different car avoidance strategies according to road conditions and a number of parking spaces for temporary avoidance, so as to implement car avoidance and scheduling of car meeting at the narrow curve, wherein the fusing car data obtained by laser radar and millimeter wave radar, so as to predict car states and driving trajectories of meeting cars comprises:

predicting the car states with the car data obtained by the laser radar through Kalman filtering; and updating measurement of the car state with the car data obtained by the millimeter wave radar through extended Kalman filtering, changing a coordinate system through a nonlinear measurement function h(x), setting a measurement noise covariance matrix R, and computing a new jacobian matrix $H_j$, such that measurement updating is implemented, wherein in a prediction stage, after the car data carData collected by the laser radar is received, a predicted value $\widehat{carData}'$ of the car data is computed through a state prediction formula;

in an updating stage, a filter compares the predicted value $\widehat{carData}'$ of the car data with a measured value, and conducts data fusion, such that updated car data, that is, an optimal estimated value $\widehat{carData}'$ is obtained; and after time Δt, measured values of the laser radar and the millimeter wave radar are received again, and a next round of prediction and updating is started;

wherein the state prediction formula is:

$$\widehat{carData}' = F*\widehat{carData}' + B*u + W$$

in the formula, F denotes a state transition matrix configured to predict a next state value, $\widehat{carData}'$ denotes an optimal estimated value obtained through comprehensive prediction and measurement of the cars at a last moment, B denotes a control matrix, u denotes a control variable, and w denotes a noise term; and B*u=0 is set, and influence of acceleration and the noise term w are added, and are represented by a process noise vector noise, that is:

$$\widehat{carData}' = F*\widehat{carData}' + \text{noise}.$$

2. The method for scheduling cars at a narrow curve based on a parking space for temporary avoidance according to claim 1, wherein in the updating stage, a computation mode of the optimal estimated value $\widehat{carData}'$ is:

$$\widehat{carData}' = \widehat{carData}' + K*y$$

in the formula, K denotes a Kalman gain, and y denotes a measurement residual vector.

3. The method for scheduling cars at a narrow curve based on a parking space for temporary avoidance according to claim 1, wherein the car avoidance strategies comprise a car avoidance strategy in a case without lane lines, and the car avoidance strategy in the case without lane lines comprises:

determining a number of the parking spaces for temporary avoidance between two meeting cars, and executing, in response to determining that the number of the parking space for temporary avoidance is 1, an avoidance strategy I, wherein the avoidance strategy I comprises:

recording a road zone in a range of several meters before and after the parking space for temporary avoidance as an expected meeting zone expectMeet; and further determining, in response to determining that the expected meeting point predictMeet is located in the expected meeting zone expectMeet, whether a road surface is an undulant road surface; using, in response to determining that the road surface is the undulant road surface, a downhill car as an avoiding car, and using an uphill car as a to-be-avoided car, wherein the avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes; and using, in response to determining that the road surface is not the undulant road surface, a car close to the parking space P for temporary avoidance as an avoiding car, and using a car at the other side as a to-be-avoided car, wherein the avoiding car enters a parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

4. The method for scheduling cars at a narrow curve based on a parking space for temporary avoidance according to claim 3, wherein the avoidance strategy I further comprises:

using, in response to determining that the expected meeting point predictMeet is at a left side of the expected meeting zone expectMeet, a right car as the avoiding car, and using a left car as the to-be-avoided car, wherein the avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

5. The method for scheduling cars at a narrow curve based on a parking space for temporary avoidance according to claim 3, wherein the avoidance strategy I further comprises:

using, in response to determining that the expected meeting point predictMeet is at a right side of the expected meeting zone expectMeet, a left car as the avoiding car, and using a right car as the to-be-avoided car, wherein the avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

6. The method for scheduling cars at a narrow curve based on a parking space for temporary avoidance according to claim 3, wherein the car avoidance strategy in the case without lane lines further comprises:

executing, in response to determining that the number of the parking spaces for temporary avoidance is 2, an avoidance strategy II, wherein the avoidance strategy II comprises:

selecting, in response to determining that the expected meeting point predictMeet is in the expected meeting zone $expectMeet_1$, the parking space $P_1$ for temporary avoidance as a current meeting avoidance parking space P, and determining whether road surfaces of the expected meeting zone $expectMeet_1$ and around the expected meeting zone are undulant road surfaces;

selecting, in response to determining that the expected meeting point predictMeet is in the expected meeting zone $expectMeet_2$, the parking space $P_2$ for temporary avoidance as a current meeting avoidance parking space P, and determining whether road surfaces of the expected meeting zone $expectMeet_2$ and around the expected meeting zone are undulant road surfaces; and selecting, in response to determining that the expected meeting point predictMeet is at a left side of the expected meeting zone $expectMeet_1$, the parking space $P_1$ for temporary avoidance as the current meeting avoidance parking space P, using a right car as the avoiding car, and using a left car as the to-be-avoided car, wherein the avoiding car enters the parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes.

7. The method for scheduling cars at a narrow curve based on a parking space for temporary avoidance according to claim 6, wherein the avoidance strategy II further comprises:

further computing, in response to determining that the expected meeting point predictMeet is between the expected meeting zones expectMeet and $expectMeet_2$, avoidance time $T_{avoid}$;

computing time required for meeting car A and car B to reach the parking spaces $P_1$ and $P_2$ for temporary avoidance according to speeds of the meeting cars, and recording the time as $T_{AP1}$, $T_{AP2}$, $T_{BP1}$ and $T_{BP2}$, respectively; and computing the avoidance time required for the following two avoidance solutions:

solution (1): selecting the parking space $P_1$ for temporary avoidance as the current meeting avoidance parking space P, using a left car as the avoiding car, and using a right car as the to-be-avoided car, wherein the avoiding car enters the parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes; and in this case, the avoidance time $T_{avoid}$ indicates time required for the to-be-avoided car to pass the current meeting avoidance parking space P after the avoiding car enters the current meeting avoidance parking space P:

$$T_{avoid}=T_{BP1}-(T_{AP1}+T_{extra});\text{ and}$$

solution (2): selecting the parking space $P_2$ for temporary avoidance as the current meeting avoidance parking space P, using a right car as the avoiding car, and using a left car as the to-be-avoided car, wherein the avoiding car enters the parking space P for temporary avoidance, the to-be-avoided car has to enter the expected meeting zone $expectMeet_2$ only after the avoiding car enters the parking space P for temporary avoidance, and the avoiding car has to drive out of the parking space P for temporary avoidance only after the to-be-avoided car passes;

in this case, the avoidance time $T_{avoid}$ indicates time required for the to-be-avoided car to pass the current meeting avoidance parking space P after the avoiding car enters the current meeting avoidance parking space P:

$$T_{avoid}=T_{AP2}-(T_{BP2}+T_{extra})$$

recording, in response to determining that the parking space is at the left side of the car, extra parking time of a driver due to a parking space position as $T_{extra}$:

$$T_{extra}=\begin{cases}0, & \text{a current meeting avoidance parking space } P \text{ is located at a right side of a car entering a parking space}\\ t, & \text{a current meeting avoidance parking space } P \text{ is located at a left side of a car entering a parking space}\end{cases}$$

comparing the avoidance time $T_{avoid}$ of the two solutions, and selecting the solution achieving shorter avoidance time as an avoidance strategy for current meeting.

8. The method for scheduling cars at a narrow curve based on a parking space for temporary avoidance according to claim 6, wherein using, in response to determining that the road surfaces of the expected meeting zone $expectMeet_1$ or $expectMeet_2$ and around the expected meeting zone are the undulant road surfaces, a downhill car as the avoiding car, and using an uphill car as the to-be-avoided car, wherein the avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes; and using, in response to determining that the road surfaces of the expected meeting zone $expectMeet_1$ or $expectMeet_2$ and around the expected meeting zone are not the undulant road surfaces, a car close to the parking space P for temporary avoidance as the avoiding car, and using a car at the other side as the to-be-avoided car, wherein the avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

9. The method for scheduling cars at a narrow curve based on a parking space for temporary avoidance according to claim 1, wherein the car avoidance strategies comprise a car avoidance strategy in a case with lane lines, and the car avoidance strategy in the case with lane lines comprises:

determining a number of the parking spaces for temporary avoidance between two meeting cars, and executing, in response to determining that the number of the parking space for temporary avoidance is 1, an avoidance strategy III, wherein the avoidance strategy III comprises:

using, no matter where the expected meeting point predictMeet is located, a car close to the parking space P for temporary avoidance as the avoiding car, and using a car at the other side as the to-be-avoided car, wherein the avoiding car enters the parking space P for temporary avoidance, the to-be-avoided car has to enter the expected meeting zone expectMeet only after the avoiding car enters the parking space P for temporary avoidance, and the avoiding car has to drive out of the parking space P for temporary avoidance only after the to-be-avoided car passes.

10. The method for scheduling cars at a narrow curve based on a parking space for temporary avoidance according to claim 9, wherein in response to determining that the number of the parking spaces for temporary avoidance is 2, whether the parking spaces for temporary avoidance are located at a same side of a road is determined; and in response to determining that the parking spaces for temporary avoidance are located at the same side of the road, an avoidance strategy IV is executed, wherein the avoidance strategy IV comprises:

selecting, in response to determining that the expected meeting point predictMeet is in the expected meeting zone $expectMeet_1$ or at a left side of the expected meeting zone $expectMeet_1$, the parking space $P_1$ for temporary avoidance as the current meeting avoidance parking space P, using a car located at a same side as the current meeting avoidance parking space P as the avoiding car, and using a car at the other side as the to-be-avoided car, wherein the avoiding car enters the current meeting avoidance parking space P, the to-be-avoided car has to enter the expected meeting zone $expectMeet_1$ only after the avoiding car enters the current meeting avoidance parking space P, and the avoiding car has to drive out of the current meeting avoidance parking space P only after the to-be-avoided car passes.

11. The method for scheduling cars at a narrow curve based on a parking space for temporary avoidance according to claim 10, wherein the avoidance strategy IV further comprises:

selecting, in response to determining that the expected meeting point predictMeet is at a right side of the expected meeting zone $expectMeet_1$, the parking space $P_2$ for temporary avoidance as the current meeting avoidance parking space P, using a car located at a same side as the current meeting avoidance parking space P as the avoiding car, and using a car at the other side as the to-be-avoided car, wherein the avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

12. The method for scheduling cars at a narrow curve based on a parking space for temporary avoidance according to claim 10, wherein in response to determining that the number of the parking spaces for temporary avoidance is 2 and the parking spaces for temporary avoidance are located at different sides of the road, an avoidance strategy V is executed, and the avoidance strategy V comprises:

selecting, in response to determining that the expected meeting point predictMeet is in the expected meeting zone $expectMeet_1$ or at a left side of the expected meeting zone $expectMeet_1$, the parking space $P_1$ for temporary avoidance as the current meeting avoidance parking space P, using a car located at a same side as the current meeting avoidance parking space P as the avoiding car, and using a car at the other side as the to-be-avoided car, wherein the avoiding car enters the current meeting avoidance parking space P, the to-be-avoided car has to enter the expected meeting zone $expectMeet_1$ only after the avoiding car enters the current meeting avoidance parking space P, and the avoiding car has to drive out of the current meeting avoidance parking space P only after the to-be-avoided car passes; and selecting, in response to determining that the expected meeting point predictMeet is in the expected meeting zone $expectMeet_2$ or at a right side of the expected meeting zone $expectMeet_2$, the parking space $P_2$ for temporary avoidance as the current meeting avoidance parking space P, using a car located at a same side as the current meeting avoidance parking space P as the avoiding car, and using a car at the other side as the to-be-avoided car, wherein the avoiding car enters the current meeting avoidance parking space P, the to-be-avoided car has to enter the expected meeting zone $expectMeet_2$ only after the avoiding car enters the current meeting avoidance parking space P, and the avoiding car has to drive out of the current meeting avoidance parking space P only after the to-be-avoided car passes.

13. The method for scheduling cars at a narrow curve based on a parking space for temporary avoidance according to claim 12, wherein the avoidance strategy V further comprises:

computing, in response to determining that the expected meeting point predictMeet is between the expected meeting zone $expectMeet_1$ and the expected meeting zone $expectMeet_2$, avoidance time $T_{avoid}$, specifically, computing time required for meeting car A and car B to reach the parking spaces $P_1$ and $P_2$ for temporary avoidance according to speeds of the meeting cars, and recording the time as $T_{AP1}$, $T_{AP2}$, $T_{BP1}$ and $T_{BP2}$, respectively; and computing the avoidance time required for the following two avoidance solutions:

solution (1): selecting the parking space $P_1$ for temporary avoidance as the current meeting avoidance parking space P, using a car located at a same side as the current meeting avoidance parking space P as the avoiding car, and using a car at the other side as the to-be-avoided car, wherein the avoiding car enters the parking space P for temporary avoidance, the to-be-avoided car has to enter the expected meeting zone $expectMeet_1$ only after the avoiding car enters the parking space P for temporary avoidance, and the avoiding car has to drive out of the parking space P for temporary avoidance only after the to-be-avoided car passes;

in response to determining that the current meeting avoidance parking space P is located at a left side of the avoiding car, the avoidance time $T_{avoid}$ indicates waiting time required for the to-be-avoided car when the avoiding car enters the current meeting avoidance parking space P:

$$T_{avoid}=(T_{BP1}+T_{extra})-T_{AP1}$$

in response to determining that the current meeting avoidance parking space P is located at a right side of the avoiding car, the avoidance time $T_{avoid}$ indicates time required for the to-be-avoided car to pass the current meeting avoidance parking space P after the avoiding car enters the current meeting avoidance parking space P:

$$T_{avoid}=T_{BP1}-(T_{AP1}+T_{extra})$$

solution (2): selecting the parking space $P_2$ for temporary avoidance as the current meeting avoidance parking space P, using a car located at a same side as the current meeting avoidance parking space P as the avoiding car, and using a car at the other side as the to-be-avoided car, wherein the avoiding car enters the parking space P for temporary avoidance, the to-be-avoided car has to enter the expected meeting zone $expectMeet_2$ only after the avoiding car enters the parking space P for temporary avoidance, and the avoiding car has to drive out of the parking space P for temporary avoidance only after the to-be-avoided car passes;

in response to determining that the current meeting avoidance parking space P is located at a left side of the avoiding car, the avoidance time $T_{avoid}$ indicates waiting time required for the to-be-avoided car when the avoiding car enters the current meeting avoidance parking space P:

$$T_{avoid}=(T_{AP2}+T_{extra})-T_{BP2}$$

in response to determining that the current meeting avoidance parking space P is located at a right side of the avoiding car, the avoidance time $T_{avoid}$ indicates time required for the to-be-avoided car to pass the current meeting avoidance parking space P after the avoiding car enters the current meeting avoidance parking space P:

$$T_{avoid}=T_{AP2}-(T_{BP2}+T_{extra})$$

recording, in response to determining that the parking space is at the left side of the car, parking time, increased due to a parking space position, of a driver as $T_{extra}$, and $$T_{extra}=\begin{cases}0, & \text{a current meeting avoidance parking space } P \text{ is located at a right side of a car entering a parking space}\\ t, & \text{a current meeting avoidance parking space } P \text{ is located at a left side of a car entering a parking space}\end{cases}$$

comparing the avoidance time $T_{avoid}$ for two cases in the two solutions, and selecting the solution achieving shorter avoidance time as an avoidance strategy for current meeting.

* * * * *